UNITED STATES PATENT OFFICE.

WILLIAM NIELSON, OF NEW YORK, N. Y.

PLASTIC COMPOUND FOR WALL-DECORATIONS, &c.

SPECIFICATION forming part of Letters Patent No. 332,162, dated December 8, 1885.

Application filed July 9, 1885. Serial No. 171,102. (No specimens.)

*To all whom it may concern:*

Be it known that I, WILLIAM NIELSON, a citizen of the United States, residing at New York, in the county and State of New York, have invented new and useful Improvements in Plastic Compounds for Wall-Decorations, of which the following is a specification.

This invention relates to a plastic compound which is particularly intended to form ornaments in ceilings and on walls in dwelling-houses and other buildings, and which can be whitewashed without deleterious effect to the compound.

My compound consists of the following ingredients: water, about two gallons; glue, about one-half pound; alum, about one pound; boiled oil, about three pints; whiting, about eight pounds, and plaster-of-paris to bring the mass to the required consistency.

In preparing my compound I proceed as follows: I take one gallon of water and boil therein one-half pound of glue. In another kettle I place one gallon of water and one pound of alum, and boil. To the solution of glue I add one quart of boiled linseed-oil and heat to the boiling-temperature, and at that point I introduce the solution of alum. By the action of the alum the glue is rendered insoluble in water. Into the mixture thus obtained I stir eight pounds of whiting mixed with one pint of boiled oil. By these means a jelly-like mass is obtained, which is rendered plastic by adding thereto a suitable quantity of plaster-of-paris.

By taking six parts, by weight, of the jelly-like mass and three parts, by weight, of plaster-of-paris a plastic mass is obtained which can be used for forming center-pieces for ceilings or other decorations of a similar nature. For other purposes the proportion of plaster-of-paris may be increased or decreased as experience dictates.

The glue being rendered insoluble in water by the presence of the alum, the ornaments produced from the compound can be whitewashed without deleterious effect, which is not the case with artificial wood ornaments made from a composition of glue, rosin, water, linseed-oil, and whiting or plaster-of-paris.

What I claim as new, and desire to secure by Letters Patent, is—

A plastic compound made from glue, alum, boiled linseed-oil, whiting, water, and plaster-of-paris, substantially in the manner above set forth.

In testimony whereof I have hereunto set my hand and seal in the presence of two subscribing witnesses.

WILLIAM NIELSON. [L. S.]

Witnesses:
A. FABER DU FAUR, Jr.,
E. F. KASTENHUBER.